(12) United States Patent
Sullivan

(10) Patent No.: US 8,176,156 B1
(45) Date of Patent: May 8, 2012

(54) SERVER IDENTIFICATION ASSIGNMENT IN A DISTRIBUTED SWITCHED STORAGE ENVIRONMENT

(75) Inventor: Douglas Sullivan, Milford, MA (US)

(73) Assignee: EMC Corporation, Hopkinton, MA (US)

(*) Notice: Subject to any disclaimer, the term of this patent is extended or adjusted under 35 U.S.C. 154(b) by 884 days.

(21) Appl. No.: 10/735,432

(22) Filed: Dec. 12, 2003

(51) Int. Cl.
*G06F 15/173* (2006.01)
(52) U.S. Cl. ........................................ 709/223; 709/201
(58) Field of Classification Search .................. 709/223, 709/201
See application file for complete search history.

(56) References Cited

U.S. PATENT DOCUMENTS

| | | | |
|---|---|---|---|
| 6,377,987 B1 * | 4/2002 | Kracht | 709/220 |
| 7,194,538 B1 * | 3/2007 | Rabe et al. | 709/224 |
| 7,225,239 B2 * | 5/2007 | King et al. | 709/220 |
| 2003/0023665 A1 * | 1/2003 | Matsunami et al. | 709/201 |
| 2003/0101340 A1 * | 5/2003 | Sato | 713/155 |

* cited by examiner

*Primary Examiner* — Kyung H Shin
(74) *Attorney, Agent, or Firm* — Krishnendu Gupta; Scott A. Ouellette

(57) ABSTRACT

A method and apparatus are provided for assigning/obtaining enclosure identification numbers in a distributed switch storage system. The method takes advantage a network topology wherein one port on the switch is always used as a downstream connection (towards a control station) and one always used as an upstream connection (away from the control station). Using single-hop type packets an assignment arbitration protocol ensures that each enclosure is assigned a unique and predictable Enclosure ID.

6 Claims, 5 Drawing Sheets

SERVER IDENTIFICATION ASSIGNMENT IN A DISTRIBUTED SWITCHED STORAGE ENVIRONMENT

FIELD OF THE INVENTION

This invention relates generally to the field of storage, and more particularly to a method and apparatus for distributing and using server identification numbers in a distributed storage system.

SUMMARY OF THE INVENTION

According to one aspect of the invention, a scalable network attached storage system includes at least one enclosure, the enclosure including a switch having a first port for communicating with an upstream enclosure and a second port for communicating with a downstream enclosure, the enclosure further comprising a storage device for storing an identification number of at least one enclosure.

According to another aspect of the invention, a network attached storage system includes a control station and a plurality of enclosures, the enclosures being coupled in a chain, with the first enclosure in the chain being directly connected to the control station, wherein each of the plurality of enclosures has a corresponding identifier, and wherein each identifier of each enclosure is assigned a value according to a position of the enclosure in the chain.

According to a further aspect of the invention, a high availability network attached storage system includes at least one control station, and a plurality of enclosures. Each enclosure includes a first switch and a second switch, wherein the first switches of each of the plurality of enclosures are serially linked to provide a first communication path, and the second switches of each of the plurality of enclosures are serially linked to provide a second communication path. The high availability network also includes means for determining a first identification number and a second identification number for each enclosure through the use of the first communication path and second communication path, respectively, means for comparing the first identification number and the second identification number for each enclosure to determine if there is a match, and means for storing the first identification number for each enclosure responsive to a match between the first identification number and the second identification number for the respective enclosure.

According to another aspect of the invention, a method for assigning identification numbers to a plurality of serially linked enclosures is provided, wherein each enclosure has an upstream communication path and a downstream communication path. The method includes the steps of issuing a discovery command by a control station linked to a first enclosure in the plurality of serially linked enclosures, and, in response to receipt of the command at the first enclosure on its downstream communication path, forwarding the command to a next enclosure in the plurality of serially linked enclosures on its upstream communication path and forwarding a device query on a downstream communication path to determine whether an immediate downstream device is of a predetermined type.

According to another aspect of the invention, a method for assigning identification numbers to a plurality of serially linked enclosures is provided, where each enclosure includes a pair of upstream communication paths and a pair of downstream communication paths. The method includes the steps of determining, through discovery on each pair of upstream and downstream communication paths, a pair of identification numbers for each enclosure, comparing each pair of identification numbers for each enclosure to determine a match for the enclosure; and saving at least one identification number of the pair as an identification number for each enclosure responsive to a match between the pair.

According to further aspect of the invention, a storage device on an enclosure in a networked storage system is provided for storing an identification number having a value selected in response to a value of an identifier of another enclosure in the networked storage system, and for providing the value of the identifier to a coupled control station

DESCRIPTION OF ILLUSTRATIVE EMBODIMENTS

Figure 1:
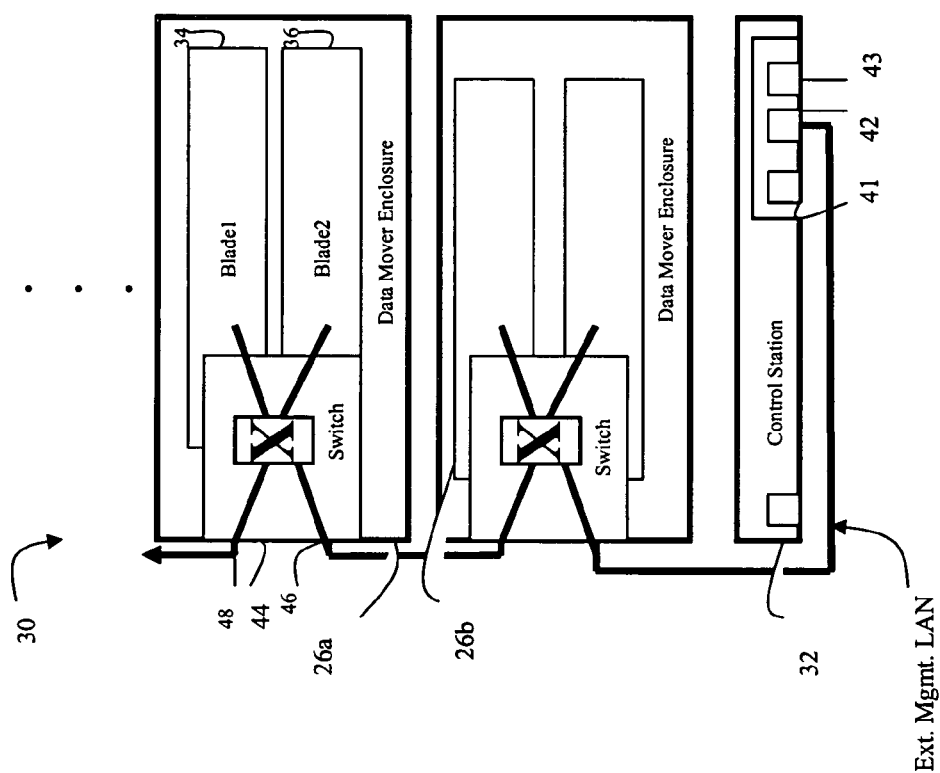
FIG. 1 is a block diagram of a scalable networked storage system in which the present invention may be implemented.

Referring now to FIG. 1, a high availability Network Attached Storage (NAS) system 30 is shown. The NAS system 30 is described in U.S. patent application Ser. No. 10/673,303, filed Sep. 29, 2003 by Valentine et al, and is incorporated herein by reference. The NAS system 30 is a scalable, modular storage system which may be customized to fit the needs of the customer by adding one or more data moving enclosures 26a, 26b to control station 32. Each data moving enclosure includes one or more data storage blades, 34 and 36 and therefore provide, among other functions, file server, data management and data integrity functionality.

Each data moving enclosure includes at least one switch, such as switch 44. Each switch is used to chain together the enclosures to enable communication between the control stations and the enclosures with a minimal amount of cabling overhead. Each switch includes at least an upstream input port 48 for receiving data from an upstream device, and a downstream output port 46 for forwarding data to a coupled downstream device. For the purposes of this application the upstream direction is away from the control station, and the downstream direction is toward the control station.

In one embodiment of the invention, the switches are Ethernet switches and communication between the control station and enclosures is performed using packets formatted according to the Ethernet protocol. In addition to the IP address of each Media Access Controller (MAC) in each enclosure, each enclosure is also assigned an Enclosure Identifier (ID). The Enclosure ID identifies each enclosure and is used for the purposes of fault handling and power supply assignment. The Enclosure ID is stored in a storage device on each switch. Advantageously, each Enclosure IDs is also stored in Non-Volatile RAM on a system backplane (not shown).

According to one aspect of the invention, a method and apparatus are provided for assigning/obtaining enclosure identification numbers in an Ethernet coupled system such as that of FIG. 1. The method takes advantage of the Ethernet topology of the system, in particular that one port on the switch is always used as a downstream connection (towards the control station(s)) and one always used as an upstream connection (away from the control station). Using single-hop type packets, that is packets that are programmed to travel no more than one communication link, an assignment arbitration protocol ensures that each enclosure is assigned a unique Enclosure ID. In one embodiment, the enclosure IDs are assigned in sequential, increasing order from the enclosure closest to the control station to the last enclosure in the system, although the present invention is not limited to any particular identification values.

Figure 2:
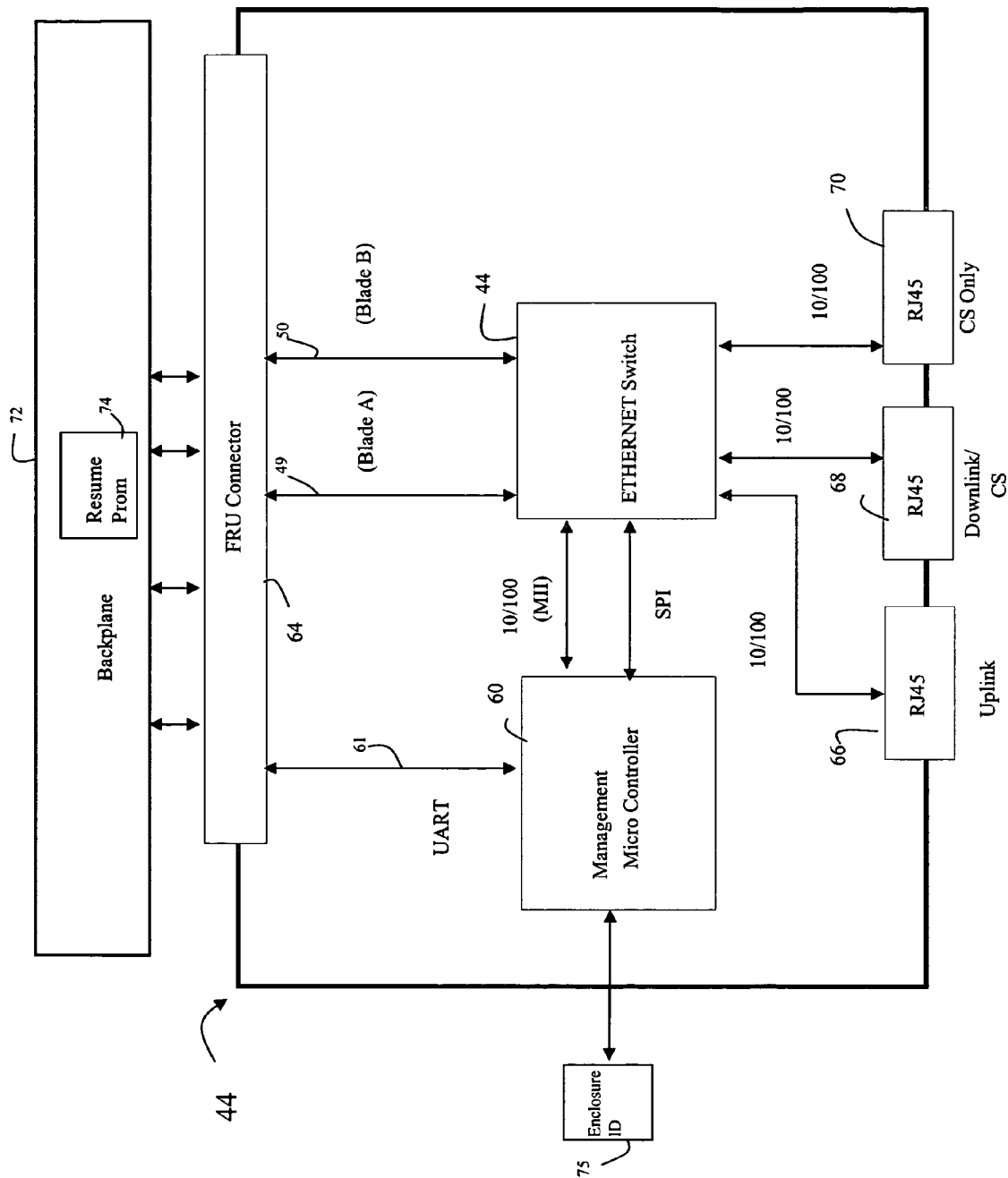
FIG. 2 is a block diagram illustrating several components that may be included in a switched enclosure of the system of FIG. 1.

FIG. 2 illustrates exemplary components that may be included in one embodiment of a switch 44 according to the present invention. Switch 44 is coupled to the system 30 via backplane 72. A Resume Prom 74 is one shown component on the backplane 72. The Resume Prom 74 is a non-volatile memory capable of containing certain critical system information that may be used, for example, to restore the system following a fault or power fail.

As described above, each switch is used to chain together the enclosures to enable communication between the control stations and the enclosures with a minimal amount of cabling overhead. Thus each switch includes at least an uplink port 66 for receiving data from an upstream device, and a downlink port 68 for forwarding data to a coupled downstream device and ultimately the control station. In addition, the switch 44 may advantageously includes a second control station input port 70, which is used in a high-availability embodiment of the present invention that will be described in more detail below with respect to FIG. 4. The switch 44 is also shown to include two communication paths 49 and 50, for exchange of information between the Blades 34, 36 and the switch 44. The switch may also include a management microcontroller 60, which is used to control the interface of the communication paths and the switch. In one embodiment, the microcontroller also controls a serial bus connection 61, which may be used to gather system information for storage in the Prom 74, among other tasks. The switch 44 may be any multi-port switch that is available in the market, for example a low cost Ethernet switch. The present invention is not limited to any particular switch device.

According to one aspect of the invention, an Enclosure ID 75 is stored for each enclosure. The Enclosure ID is shown in FIG. 2 as stored in a discrete memory device, however, it is understood that it can be stored in any accessible location on the enclosure, including but not limited to in a register or other memory in the microcontroller. The Enclosure ID is a unique identifier for the associated enclosure, and may be used as an identifier when the enclosure signals environmental conditions, such as faults and power supply status, to the control station 32.

One method of assigning Enclosure IDs uses the nature of the daisy chain architecture of the enclosures in combination with single hop packets to serially assign IDs to enclosures in a predictable manner. The single hop packets are sent upstream and downstream from the enclosures to 'discover' other connected enclosures, and in particular to determine which enclosure is the enclosure coupled directly to the control station. When one of the enclosures discovers that it is located near the control station, it assigns itself an identifier, and passes the identifier on to the next enclosure, which sets its identifier relative to the received, downstream identifier value, and proceeds to cascade its identifier to the next upstream device. This process continues at each enclosure until all enclosures are assigned identifiers. Thus, the process provides a predictable and sequential method for assigning identifiers. The process may be performed at initialization or at any point during operation of the system at the command of the control station.

Figure 3:
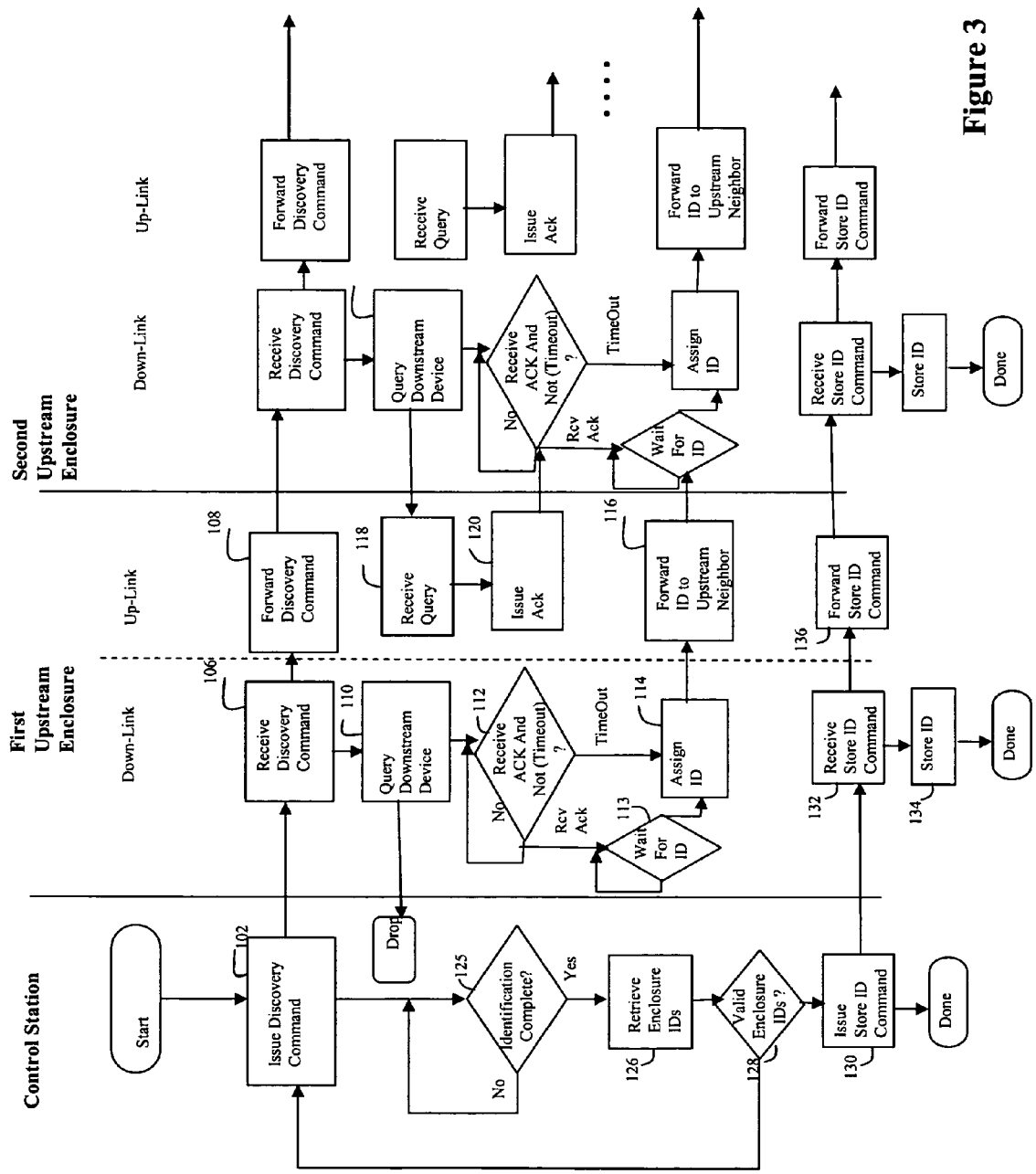
FIG. 3 is a flow diagram illustrating one embodiment of a method that may be used to assign identification numbers to the coupled enclosures of FIG. 1.

A more detailed description of the process and the interaction between coupled to devices will now be provided with regard to FIG. 3. At step 102, the control station 32 initiates a discovery process by sending a command to the management microcontrollers of all switches. The command, for example, may be a multicast command with each enclosure being a member of the multicast group. At step 110, in response to receipt of the command, each management microcontroller will send out a query on their downlink port to determine if a switch exists below them. At step 112, the microprocessor enters a wait state, waiting to receive an acknowledgement to the query.

Each microcontroller includes a register identifying the type of device in which it operates. When the query is received by each enclosure, such as at step 118, each microcontroller on the switch compares the queried device type against its device type, and if it is a switch, at step 120 issues an acknowledgement to the upstream, querying device.

As shown in FIG. 3, each enclosure awaits an acknowledgement from the downstream enclosure for a certain time period, (indicated as TimeOut in FIG. 3). If an enclosure does receive an acknowledgement packet within the window, then it can assume that the immediate downstream device is an enclosure because the acknowledgement packets are single hop packets, and thus any acknowledgement must be from the coupled, downstream neighbor. At step 113, the enclosure then enters a wait state, awaiting receipt of an ID from a downstream neighbor. If the enclosure does not receive an acknowledgement packet within the window, then the enclosure can assume that the immediate downstream enclosure is the control station.

When an enclosure determines that it is the neighbor to the control station, (or if the enclosure receives an ID from a downstream enclosure) at step 114 the enclosure assigns itself an identifier value, for example one, and forwards the identifier value in a single hop packet to its upstream neighbor at step 116. When the upstream neighbor receives the Identifier of the neighboring downstream enclosure, it assigns its identifier based on the value of the downstream neighbor, for example by adding a fixed value such as one to the identifier. This process continues until each upstream neighbor is assigned an identifier. At step 125, the control station awaits indication that each of the enclosures have been assigned identification numbers. The indication could happen in a variety of manners, for example, once it has assigned its identifier, the last enclosure in the system could send a message to the control station indicating that identification assignment is complete. Alternatively, the control station may simply await a timeout period sufficient enough to allow the discover process to be resolved. Whichever method is used, at step 126, when it has determined that identification assignment is complete, the control station retrieves all of the identifiers and at step 128 verifies that there are no duplicate enclosure numbers. If there are duplicate enclosure numbers, the control station issues an identifier reset to each enclosure, causing the identification numbers to be reset, and then returns to step 102. However, if at 128 it is determined that there are no duplicate identification numbers, the control station sends commands at step 130 to the management microcontroller at each controller to save the enclosure ID locally on the board and on the PROM of the backplane. When each enclosure has saved the ID, the process is complete.

It should be noted that although the process has been shown and described with regard to the particular embodiment of FIG. 1, it is equally useful in any distributed architecture. For example, referring now to FIG. 4, a high availability version of the system 30 of FIG. 1 is shown to include two control stations, 32 and 33 coupled to the daisy chained enclosures 26a, 26b. Each enclosure includes, for purposes of high availability support, a pair of switches such as switches 44 and 45, with each switch having components similar to that described in FIG. 2. The Ethernet communication path is also replicated as shown in dashed ellipses 53 and 54. The high availability system provides redundant components and data paths to enable continued system support in the presence of single points of failure.

Figure 4:
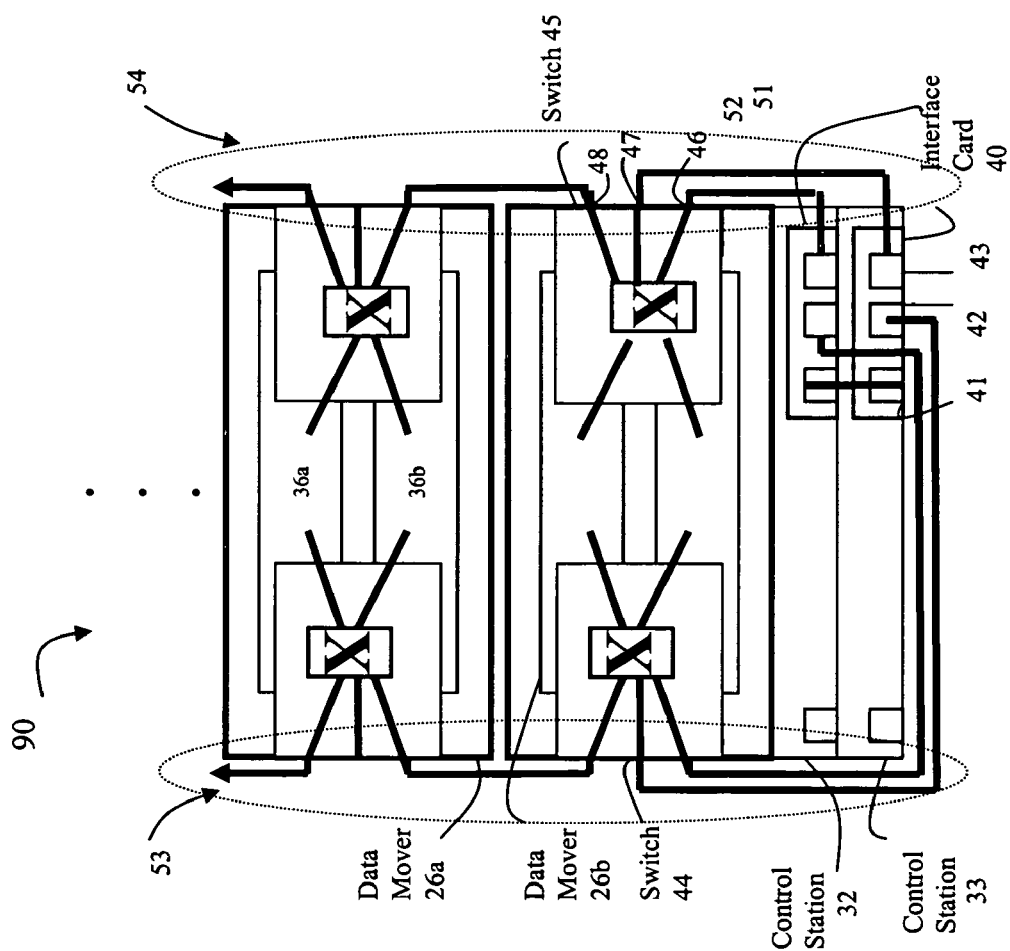
FIG. 4 illustrates a high availability embodiment of a network storage system in which the present invention may be implemented.
Figure 5:
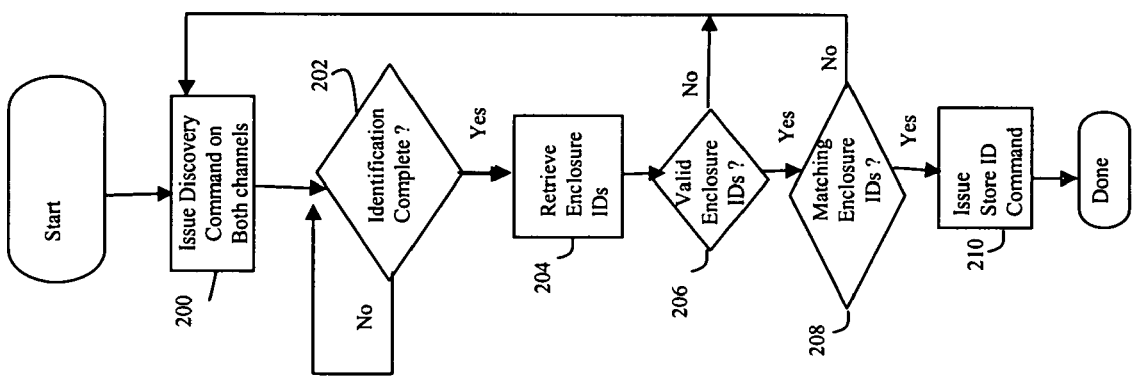
FIG. 5 is a flow diagram illustrating exemplary steps that may be used to implement concepts of the present invention in the high availability system of FIG. 4.

The method described above with regard to FIG. 3 may also be used to assign identifiers in the system of FIG. 4, with cross-checks being added for accuracy. For example, referring now to FIG. 5, modifications to the control station process are shown. At step 200, the process is executed substantially simultaneously on each communication path 53 and 54 by one of the control stations 32 or 33 issuing a Discovery Command. As described in FIG. 3, the discover command causes each enclosure to query their downstream device to determine if it is the device neighboring the control station, and then identification numbers are assigned. The process continues as described in FIG. 3 until the control station determines that the identifiers have all been assigned, and at step 204 the enclosure IDs are retrieved. At step 206 the control station verifies that the IDs are not duplicates, and at step 208 the control station compares the IDs assigned via communication path 53 with the IDs assigned via communication path 54. In one embodiment, the comparison is performed using a serial connection between the switches in the enclosure (for example, via the UART path 61 in FIG. 2). The serial connection allows the peer devices to directly communicate and verify enclosure ID assignment before communicating IDs back to the control station. The IDs should match, and if they do the process proceeds to step 210, where the control station issues the store ID command to the enclosures. If there is a mismatch between the data-paths, or if one of the IDs is invalid (due to replication, for example), then the process returns to step 200.

Accordingly, a method and apparatus that may be used to sequentially assign IDs to enclosures in a switched, distributed storage system has been described. The method takes advantage of the scalable architecture of the storage system to provide a straightforward assignment mechanism that is fast and predictable. Several embodiments have been described, but the invention is not to be limited by the specific embodiments described herein, but rather by the spirit and scope of the claims appended hereto.

I claim:

1. A scalable network attached storage system comprising:
at least one enclosure, the enclosure including at least one storage blade and a switch having a first port for communicating with an upstream enclosure and a second port for communicating with a downstream device, the enclosure further comprising a storage device for storing an identification number of the at least one enclosure, wherein each of the plurality of enclosures has a corresponding identifier, wherein at any point during operation of the system at the command of a control station each enclosure discovers its neighboring devices to determine which enclosure has the control station as a neighboring device, and wherein a first enclosure having the control station as a neighboring device assigns itself a first identification number and sends the first identification number to a second enclosure downstream from the first enclosure, wherein the second enclosure upon receiving the first identification number assigns itself a second identification number, wherein the second enclosure derives the second identification number by performing a function on the first identification number and each subsequent enclosure assigns itself a value as its identification number, wherein the value is derived by performing the function on an identification number received from an immediately preceding enclosure.

2. The scalable network of claim 1, further comprising a backplane, for coupling the at least one enclosure, the backplane comprising a storage device for storing a copy of the identification number of the at least one enclosure.

3. The scalable network of claim 1, wherein the function performed on a value received from an immediately preceding enclosure includes incrementing the value.

4. A network attached storage system including:
a control station; and
a plurality of enclosures, the enclosures comprising at least one storage blade and a switch, the enclosures being coupled in a chain, with a first enclosure in the chain being directly connected to the control station, wherein each of the plurality of enclosures has a corresponding identifier, wherein at any point during operation of the system at the command of a control station each enclosure discovers its neighboring devices to determine which enclosure has the control station as a neighboring device, wherein the first enclosure having the control station as a neighboring device assigns itself a first identification number and sends the first identification number to a second enclosure downstream from the first enclosure, wherein the second enclosure upon receiving the first identification number assigns itself a second identification number, wherein the second enclosure derives the second identification number by performing a function on the first identification number and each subsequent enclosure assigns itself a value as its identification number, wherein the value is derived by performing the function on an identification number received from an immediately preceding enclosure.

5. The network of claim 4, wherein the value of an identifier for a given enclosure in the chain is assigned responsive to a value of an identifier of an enclosure immediately preceding the given enclosure in the chain.

6. The network attached storage system of claim 4 further comprising a backplane, coupled to the plurality of enclosures, the backplane including a device for storing a copy of each identifier for the plurality of enclosures.

* * * * *